2,989,451
IRRADIATED POLYETHYLENE
Robert J. Prochaska, Lanesboro, Mass., assignor to General Electric Company, a corporation of New York
No Drawing. Filed June 16, 1955, Ser. No. 516,023
2 Claims. (Cl. 204—154)

This invention is concerned with polyethylene irradiated with high energy radiation. More particularly, the invention relates to polyethylene irradiated with high energy radiation, e.g., high energy electrons, and having improved oxidation resistance at elevated temperatures due to the incorporation therein of stabilizing amounts of symmetrical di-β-naphthyl-p-phenylenediamine.

In the copending application of Elliott J. Lawton and Arthur M. Bueche, Serial No. 324,552, filed December 6, 1952, there is disclosed and claimed improved polyethylene obtained by subjecting the latter to high energy irradiation, for instance, high energy electrons. The irradiated polyethylene has the property of being substantially infusible at elevated temperatures, has reduced solubility in solvents in which the unirradiated material is soluble, and has improved resistance to stress cracking in the presence of certain environments. However, it has been found that at temperatures of above 100° C., in the presence of air, there is a marked tendency for the irradiated polyethylene to degrade and to give off undesirable amounts of decomposition products. Because of this lack of resistance at elevated temperatures to oxidation, applications for the irradiated polyethylene have been seriously curtailed, especially in electrical application where oxidation resistance is usually an essential requirement.

Many compositions have been employed for stabilizing unirradiated polyethylene to oxidation at elevated temperatures. However, attempts to use these oxidation inhibitors or "stabilizers" as they will hereinafter be referred to, have not met with success when these stabilizers were employed with irradiated polyethylene. The reasons for this are severalfold. Thus, many of the stabilizers for unirradiated polyethylene when incorporated in the polyethylene prior to irradiation do not give satisfactory stabilizing action after irradiation when used in oxidizing atmospheres at the elevated temperatures (125° to 150° C.) at which irradiated polyethylene shows an advantage over unirradiated polyethylene. Again, many of the stabilizers ordinarily employed with unirradiated polyethylene when incorporated in the latter prior to irradiation, interfere with the irradiation with the high energy electrons so that it is impossible to obtain the type of product after irradiation as is obtained with the unstabilized polyethylene employing the same conditions of irradiation. Finally, many of the usual stabilizers when incorporated in the unirradiated polyethylene and the latter subjected to high energy radiation, adversely affect the ability of the irradiated polyethylene to resist environmental stress cracking of the irradiated polyethylene in the presence of materials, such as oils, soaps, alcohols or the like (a description of the above-mentioned environmental stress cracking is more particularly described in Symposium on Polyethylene, presented at the AIEE Fall General Meeting at Cleveland, Ohio, on October 22 to 26, 1951, and more particularly found in the publication of the American Institute of Electrical Engineers, 33 West 39th Street, New York 18, New York, dated 1952; additional information with regard to this subject may be found in an article entitled, "Stress Cracking of Polyethylene" by R. H. Carey in ASTM Bulletin #167, July 1950, page 56).

Unexpectedly, I have found one stabilizer which when incorporated in the polyethylene and the latter thereafter subjected to irradiation with high energy irradiation, for instance, with high energy electrons, does not inhibit the irradiation so that the properties obtained by irradiating the polyethylene with a certain dose of high energy electrons are essentially the same as the properties obtained when irradiating polyethylene from which the stabilizer has been omitted. In addition, I have also found that the use of this particular stabilizer in no way adversely affects the stress cracking characteristics of the irradiated polyethylene. Moreover, the use of this particular stabilizer imparts to the irradiated polyethylene a marked steady resistance to oxidation at elevated temperatures over long periods of time, a resistance which is as good and in many respects better than most of the stabilizers tested for the purpose, which, however, have the additional defects listed above.

All of the foregoing desirable objectives are obtained by employing as the stabilizer in the irradiated polyethylene the compound, symmetrical di-β-naphthyl-p-phenylenediamine having the formula

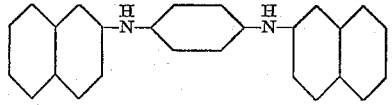

The amount of stabilizer employed may be varied within fairly wide limits, and will generally depend upon such factors as, e.g., the type of polyethylene employed (for instance, the molecular weight of the polyethylene), the irradiation dose to which the polyethylene will be subjected, the application for which the irradiated stabilized polyethylene is intended, etc. Generally I prefer to employ the stabilizer in an amount equal to from about 0.005 to 2%, by weight, or more (e.g., 0.05 to 1%) based on the weight of the polyethylene.

The stabilizer which is a crystalline material is advantageously incorporated in the polyethylene prior to irradiation by milling or by other mixing techniques. Thereafter, the polyethylene in whatever physical form it may be, for instance, sheets, tapes, films, fabricated articles, etc., is subjected to high energy irradiation, for instance, high energy electrons in any of several ways. A type of accelerator apparatus used to irradiate the polyethylene with high energy electrons is more particularly described in the copending application of Quintin P. Cole, Serial No. 437,477 filed June 17, 1954, and assigned to the same assignee as the present invention. By reference, the aforesaid Cole application is made part of the disclosures of the instant application in order to avoid repetition in the description of the high voltage apparatus employed for irradiating the polyethylene with high energy electrons. Further details of the construction and operation of a high voltage accelerating apparatus may be found in U.S. Patent 2,144,518, Westendorp, or in the magazine Electronic, vol. 16, pages 128–133 (1944).

The source of high energy radiation employed in the practice of the present invention may be varied widely. Thus, one can use as a source of high energy radiation a cathode ray generator having a circular symmetrical pattern. Alternatively one could employ other forms of irradiation such as cathode ray generators having other beam patterns, X-ray generators, or radioactive materials such as cobalt 60 source of gamma irradiation, etc. In general although one can use alpha, beta, gamma or even neutron radiation, I prefer to employ high energy electrons or cathode ray radiation, such as that which is more available and which is presently a more practical and economical source of high energy radiation found in the high energy electrons generated by the high voltage apparatus described above, for instance, in the Westendorp patent. In general the irradiation to which the stabilized polyethylene is subjected is advantageously within the range of from about 1 to $50 \times 10^6$ Roentgens. Obviously, larger amounts of radiation may be employed without departing from the scope of the invention.

The polyethylene referred to herein is a solid polymeric material formed by the polymerization of ethylene usually at elevated temperatures and pressures and preferably ranges in viscosity average molecular weight from about 16,000 to 30,000 or more. Polyethylene of viscosity average molecular weights below 16,000 may be employed if desired. Such polyethylene materials are more particularly described in U.S. Patent 2,153,553 and in Modern Plastics Encyclopedia, New York 1949, pages 268–271. Examples of commercially available polyethylene which can be employed in the practice of the instant invention are polyethylene sold by the Bakelite Corporation, Bound Brook, New Jersey; DuPont polyethylene resin sold under the name Alathon, its properties, use, etc., being set forth in DuPont Information Bulletin A–3584, published by the DuPont Polychemicals Department; Marlex polyethylene manufactured and sold by Phillips Petroleum Company, etc. The method of preparation for the polyethylene, whether at high or low temperatures or at high or low pressures (using e.g., the Ziegler process), is immaterial and any type of polyethylene may be employed in the practice of the present invention.

After incorporation of the stabilizer, the polyethylene which is subjected to irradiation may be of any size or physical state or in any form of fabrication. Thus, the polyethylene may be in the finely divided state, for instance, having an average particle size of about 50 to 400 microns, or may be of larger particle size, for instance, crumbs or pellets, in varying size or even chopped up particles of the polyethylene derived from flat sheet or stock polyethylene. This polyethylene may prior to irradiation be milled and molded into various articles of manufacture such as tapes, films, bottles, other types of containers, etc., to give products which exhibit the improved properties recited above. If desired, polyethylene tape containing the stabilizer can be wound around conductors, for instance, copper or aluminum cores, and thereafter treated with high energy electrons; alternatively the polyethylene tape or sheet containing the stabilizer can be irradiated and this tape used for insulating purposes. If the polyethylene is in sheet or tape form, the polyethylene can be irradiated first from one side and then on the other or in some cases from both sides simultaneously to assure uniform treatment. In certain instances it may be desirable to irradiate the polyethylene in an inert atmosphere of nitrogen, argon, helium, krypton, or xenon, etc., to minimize oxidation by atmospheric oxygen during the irradiating procedure. Generally, such precautions may not be necessary in view of the fact that an oxidation stabilizer is present in the polyethylene at the time of irradiation.

In order that those skilled in the art may better understand how the present invention may be practiced the following examples are given by way of illustration and not by way of limitation. All parts and percents are by weight.

In the following examples, the test method for determining the stress cracking characteristics of irradiated polyethylene follow the procedure described in an article by DeCoste, Malm and Wallder, I.E.C. 43, 117 (1951). Generally this test consists in scoring the surface of a piece of polyethylene 0.1 by 0.5 by 1.5" and bending it double so that stresses are produced, and introducing the sample into a test tube containing an activating cracking agent such as acetic acid or Igepal (a non-ionic liquid alkyl phenol-ethylene oxide condensation product manufactured by General Dyestuffs Corporation, New York, New York). The survival time is then recorded as the time required for the piece to fracture. All of the test data were obtained at room temperature (about 25–35° C.) and at 75° C.

EXAMPLE 1

Solid polyethylene DYNH manufactured by Bakelite Corporation having an intrinsic viscosity molecular weight of approximately 21,000 was compounded with 0.5%, by weight, thereof of various anti-oxidants normally used for the purpose and thereafter compression molded into sheets 80 by 100 mils thick which were then irradiated with high energy electrons with a dose of $15 \times 10^6$ Roentgens. Test sheets ($2\frac{1}{2}" \times 5"$) prepared from the above materials were clamped at one end and hung in a 150° C. air circulating oven. The power factors at 1 megacycle of these test sheets were measured periodically until failure. The point of failure was arbitrarily taken as a point at which the power factor showed a marked increase from the initial power factor. The power factor determinations at 1 megacycle were conducted according to ASTM specification (D150–47T) using circular aluminum foil electrodes (2" in diameter, 0.6 mil thick). The following Table I shows the various anti-oxidants employed for the purpose:

Table I

| Sample No. | Trade Name | Chemical Composition | Manufacturer |
|---|---|---|---|
| 1 | Agerite White | Symmetrical di-β-naphtyl-p-phenylenediamine. | R. T. Vanderbilt. |
| 2 | Neozone D | Phenyl-β-naphthylamine. | DuPont. |
| 3 | Flectol H | Polymerized 1,2 - dihydro-2,2,3-trimethylquinoline. | Monsanto. |
| 4 | Akroflex C | 65% phenyl - α - naphthylamine; 35% diphenyl-p-phenylenediamine. | DuPont. |

The following Table II shows the power factors of the irradiated polyethylene stabilized with the above described nitrogenous type stabilizers after 1200 hours at 150° C. In each instance the power factor at the beginning of the test was 0.001.

Table II

Power factor after 1200 hours

Agerite White _____ 0.002
Neozone D _____ 0.04
Flectol H _____ 0.015
Akroflex C _____ 0.025

Even after 1500 hours the power factor at 150° C. for the irradiated polyethylene containing the Agerite White as stabilizer was only 0.004.

When the concentration of the stabilizer was decreased to 0.2%, by weight, of the polyethylene prior to irradiation and the latter subjected to high energy electrons with a dose of $15 \times 10^6$ Roentgens, the following results were obtained. Whereas the Agerite White showed a power factor of 0.002 after 800 hours at 150° C., the Neozone D showed a power factor of about 0.04 after 550 hours, the Akroflex C showed a power factor of about 0.04 after 600 hours, and the Flectol H showed a power factor of about 0.03 after 800 hours, with the power factors steadily increasing. Another stabilizer often used with unirradiated polyethylene was tested, namely, one having the trade name Santowhite Crystals manufactured by Monsanto Chemical Company and having the chemical name 4,4'-butylidene-bis-(6-tertiary-butyl-m-cresol); this material (in a concentration of 0.2%, by weight) had a power factor of 0.02 after about 680 hours.

EXAMPLE 2

In this example 0.5% by weight of the anti-oxidants recited in Example 1 were incorporated in the same polyethylene which was thereafter irradiated with high energy electrons to a dose of $15 \times 10^6$ Roentgens. Each of the samples was then tested for weight loss in a 150° C. circulating air oven. This test comprised taking flat samples, $1\frac{1}{4}" \times 1\frac{3}{4}"$, placing them upright in beakers and the beakers placed in the aforesaid 150° C. oven. Weight measurements and visual observation were taken daily on all samples until failure. The point of failure was arbitrarily taken as a point at which the weight showed a marked increase or decrease from the daily weight trend. As a result of this test, it was found that the Agerite White lost about 0.004 g. after about 2200 hours and the weight loss was beginning to increase after that point. In contrast to the above, the sample containing the Neozone D showed a weight loss of about 0.02 g. after 700 hours, and the weight loss was increasing rapidly so that after 900 hours, the weight loss was 0.04 g.; the sample containing the Flectol H showed a weight loss after about 1200 hours of about 0.003 g. but the weight loss increased markedly so that after about 1300 to 1400 hours, the weight loss had increased to 0.04 g.; the sample containing Akroflex C showed a weight loss after about 800 hours of about 0.01 g. and the weight loss increased rapidly so that after about 950 hours the weight loss had increased to 0.04 g. The use of Santowhite crystals (more particularly described in Example 1 above) in the same amount as the other stabilizers showed good results and after 1500 hours the weight loss was about 0.013 g. and after about 2600 hours, the weight loss was of the order of about 0.016 g.

The results of Example 2 show that the Agerite White stabilizer employed in the practice of the present invention is able to maintain the oxidation resistance of the irradiated polyethylene at a higher level for longer periods of time than did any other stabilizer including Santowhite crystals.

The use of the Agerite White stabilizer has also shown an added advantage in that in contact with certain metals, such as copper, it appears to inhibit the deterioration of the irradiated polyethylene better than, for instance, another stabilizer commonly used for stabilizing polyethylene, namely, the above-described Santowhite crystals. The following example shows the results of these tests employing copper as the contacting metal.

EXAMPLE 3

Polyethylene (DE-2400 manufactured by Bakelite Corporation of about 23,000 molecular weight) was mixed with varying amounts of washed, carefully dried, finely divided copper powder (about 200 mesh) and thereafter molded into sheets about 0.04 to 0.06″ thick which were then irradiated with a dose of $15 \times 10^6$ R. Irradiated test samples (1″ x 1½″) were cut and placed upright in beakers and the beakers placed in a 150° C. circulating air oven. Weight measurements and visual observations were made periodically until failure. The time of failure was taken as the point at which there was a 10 milligram weight loss in the sample being tested. In each instance, after this 10 milligram weight loss, this loss in weight continued to increase rapidly in all instances other than where the stabilizer was the Agerite White; the samples stabilized with the Agerite White lost weight much more gradually than did the other samples. The following Table III shows the weight of the ingredients used in the original formulations prior to irradiation and includes a control which did not contain any stabilizer. Table III also shows the time at which the first signs of deterioration (as evidenced by discoloration, pitting of the surface, glazing of the surface, etc.) was observed in hours at 150° C. as well as the time at which the major weight change was observed, again in terms of hours.

Table III

| Formulation No. | 1 | 2 | 3 | 4 |
|---|---|---|---|---|
| Polyethylene parts | 100 | 100 | 100 | 100 |
| Copper Powder do | 10 | 5.0 | 1.0 | 0.5 |
| Data: | | | | |
| Time at which first sign of deterioration observed (hours) | 4 | 4 | 4 | 7 |
| Time at which major weight change observed (hours) | 40 | 30 | 30 | 28 |

| Formulation No. | 5 | 6 | 7 | 8 |
|---|---|---|---|---|
| Polyethylene parts | 100 | 100 | 100 | 100 |
| Copper Powder do | 10 | 5.0 | 1.0 | 0.5 |
| Santowhite Crystals do | 0.5 | 0.5 | 0.5 | 0.5 |
| Data: | | | | |
| Time at which first sign of deterioration observed (hours) | 48 | 48 | 48 | 48 |
| Time at which major weight change observed (hours) | 70 | 75 | 165 | 205 |

| Formulation No. | 9 | 10 | 11 | 12 |
|---|---|---|---|---|
| Polyethylene parts | 100 | 100 | 100 | 100 |
| Copper Powder do | 10 | 5.0 | 1.0 | 0.5 |
| Agerite White do | 0.5 | 0.5 | 0.5 | 0.5 |
| Data: | | | | |
| Time at which first sign of deterioration observed (hours) | 72 | 72 | 166 | 250 |
| Time at which major weight change observed (hours) | 120 | 115 | 205 | 270 |

EXAMPLE 4

Polyethylene similar to that employed in Example 3 was mixed with the finely divided copper powder also described in Example 3, and with either Agerite White or Santowhite Crystals in the following percents, by weight:

|  | Percent |
|---|---|
| Polyethylene | 99 |
| Stabilizer | 0.5 |
| Copper powder | 0.5 |

A control was also prepared composed of 99.5%, by weight, of the polyethylene and 0.5%, by weight, of the copper powder. Samples of each formulation were pressed into sheets about 60 to 80 mils thick and were irradiated with a dose of high energy electrons equal to about $15 \times 10^6$ R. Each of the sheets was then heat-aged at 150° C. and the tensile strength as well as the percent elongation of each of the samples were determined periodically at this 150° C. temperature, employing for the tensile and elongation measurements a Scott Tester (Model L-6). The results of these tests showed the following. Whereas at the start of the tests, the tensile strength of each sample was of the order of 2800 p.s.i. the unstabilized sample had a tensile strength of about 900 p.s.i. after 200 hours, and the sample stabilized with the Santowhite Crystals, after 400 hours, had a tensile strength of about 1100 p.s.i. In contrast to this, the sample stabilized with the Agerite White, after 400 hours, had a tensile strength equal essentially to that of the original unaged sample. With regard to the percent elongation, whereas the initial percent elongation of the samples prior to heat aging, was of the order of about 500–650%, the unstabilized sample had a 0% elongation after 125 hours, and the sample stabilized with the Santowhite Crystals, after about 450 hours, had a percent elongation of about 40 percent. In contrast to this, the sample stabilized with the Agerite White had a percent elongation which was essentially the same as the unaged sample.

The following example shows the advantage of using Agerite White over Santowhite Crystals when irradiating polyethylene containing each of these antioxidants.

EXAMPLE 5

A solid polyethylene resin of about 21,000 intrinsic viscosity molecular weight was intimately mixed, in one instance, with 0.5% Agerite White and in another instance with 0.5% Santowhite Crystals. Thin films of about 5 mils thick of each sample were subjected to irradiation doses of high energy electron of 5, 10 and $14 \times 10^6$ Roentgens, employing three strips of each film for each test. Each of the samples containing the Santowhite and the Agerite White, as well as a control irradiated film free of any stabilizer was immersed in boiling toluene and continuously extracted with a Soxhlet extraction for 20 hours to determine the amount of extractable material to determine the degree of solubility of the various samples which had been irradiated with different irradiation doses. As is well known, irradiation of polyethylene with high energy electrons reduces the solubility of the polyethylene in boiling toluene and results in swelling of the irradiated polyethylene when the latter is immersed in the boiling toluene. The results of these tests are shown in Table IV where the higher the percentage of unextracted material, the higher was the cross-linking due to the irradiation.

Table IV

| Sample | Dose×10⁶ Roentgens | Weight Percent Insoluble After 20 Hours Extraction |
|---|---|---|
| Unstabilized | 5 | 41.6 |
|  | 10 | 48.8 |
|  | 14 | 62.2 |
| Santowhite Crystals | 5 | 23.1 |
|  | 10 | 36.0 |
|  | 14 | 50.2 |
| Agerite White | 5 | 49.6 |
|  | 10 | 60.3 |
|  | 14 | 66.3 |

The above table shows that the Santowhite Crystals had inhibited irradiation of the polyethylene to a sufficient degree to prevent adequate cross-linking by means of high energy electrons. In contrast to this, the samples containing the Agerite White as the anti-oxidants and the control sample dissolved to a substantially lesser degree in the boiling toluene, indicating clearly that the Agerite White did not inhibit irradiation with high energy electrons, especally since the control sample which contained no stabilizer, when irradiated with the same doses, acted essentially in the same manner when immersed in the boiling toluene as did the samples containing the Agerite White.

EXAMPLE 6

About 0.5%, by weight, of Agerite White and of Santowhite Crystals were incorporated in solid polyethylene of the type used in the previous examples, and each mixture of ingredients was irradiated with high energy electrons to doses of 2.5 and 5×10⁶ R. The resistance to environmental stress cracking of the various samples of irradiated polyethylene and of unstabilized samples was tested (in accordance with the procedure described previously) in acetic acid and Igepal. The following Table V shows the results of these tests wherein the letter "I" is intended to designate the fact that the test piece was intact after 100 hours, the length of time during which the testing took place.

Table V

A. CRACKING AGENT: IGEPAL

| Temp. | Irradiation Dose (×10⁶ R) | Survival Time (Hours) | | |
|---|---|---|---|---|
|  |  | Unstabilized Polyethylene | Polyethylene + Santowhite Crystals | Polyethylene + Agerite White |
| Room Temp. (25-35° C.) | ¹0 | 239 | 191 | 5 |
|  | 2.5 | I | 108 | I |
|  | 5 | I | I | I |
| 75° C. | ¹0 | 0.1 | 0.1 | 0.1 |
|  | 2.5 | I | 0.2 | I |
|  | 5 | I | 0.3 | I |

B. CRACKING AGENT: ACETIC ACID

| Room Temp. (25-35° C.) | ¹0 | 119 | 52 | 203 |
|---|---|---|---|---|
|  | 2.5 | I | 264 | I |
|  | 5 | I | I | I |
| 75° C. | ¹0 | 0.1 | 0.1 | 0.2 |
|  | 2.5 | I | 215 | 0.2 I |
|  | 5 | I | 0.5 | I |

¹ Control.

It will, of course, be apparent to those skilled in the art that other irradiation doses, as well as various types of solid polyethylene and different concentrations of the symmetrical di-β-naphthyl-p-phenylenediamine may be employed in place of those recited in the foregoing examples without departing from the scope of the invention. Modifications of the techniques for incorporating the stabilizer, as well as other modifications, obvious from examination of the previous disclosures are intended to be included in the scope of the present invention. The use of fillers, pigments, etc., is not precluded, nor is modification with other polymers, particularly hydrocarbons advantageously affected by high energy radiation, precluded.

The stabilized irradiated polyethylene described in the present invention may be employed in various forms and shapes such as finely divided particles of polyethylene, sheets, tapes (which can be used as backing for making pressure sensitive adhesives as is more particularly disclosed and claimed in Goodwin et al. application, Serial No. 489,746, which has been filed February 21, 1955, and assigned to the same assignee as the present invention) bottles, glasses, containers, etc.; as insulation for electrical conductors, etc. The stabilized irradiated polyethylene prepared in accordance with the present invention is especially suitable for insulating various electrical members which are to be operated at temperatures of the order of about 125 to 150° C. for long periods of time without undesirable decomposition and degradation due to the oxidative effect of the air. Protective films can be prepared from the irradiated stabilized polyethylene herein described which are to be used in high temperature applications, for instance, as protective coatings in drums, cans, etc., used in storing liquids, solids, etc., which will be subjected to elevated temperatures either in use or in sterilizing operations.

The Roentgen units (which are designated as "R") are intended in their usual connotation being defined as the amount of irradiation that produces one electrostatic unit of charge or ion pairs per millitre of dry air under standard conditions and as employed herein refers to the amount of electron irradiation dose introduced into the polyethylene measured with an air equivalent ionization chamber.

What I claim as new and desire to secure by Letters Patent of the United States is:

1. The process for stabilizing irradiated polyethylene against the oxidative effects of air at temperatures of about 150° C. which comprises incorporating in the aforesaid polyethylene from 0.005 to 2%, by weight, based on the weight of the polyethylene, of symmetrical di-beta-naphthyl-p-phenylenediamine, and thereafter subjecting the polyethylene to irradiation with high energy electrons within the dose range of from 1 to 50×10⁶ Roentgens.

2. Electron irradiated polyethylene stabilized against oxidation in air at temperatures of about 150° C. by having incorporated therein from 0.005 to 2%, by weight, thereof of symmetrical di-beta-naphthyl-p-phenylenediamine, the polyethylene having been irradiated with a dose of from 1 to 50×10⁶ Roentgens.

References Cited in the file of this patent

UNITED STATES PATENTS 2,727,879    Vincent et al.     Dec. 20, 1955

OTHER REFERENCES

"Modern Plastics," vol. 31, No. 8, pages 100, 101 and 219, April 1954.

Ballantine: "Modern Plastics," page 136, November 1954.